(12) United States Patent
Wu et al.

(10) Patent No.: US 9,224,062 B2
(45) Date of Patent: Dec. 29, 2015

(54) HYBRID METHOD AND SYSTEM OF VIDEO AND VISION BASED ACCESS CONTROL FOR PARKING STALL OCCUPANCY DETERMINATION

(71) Applicant: Xerox Corporation, Norwalk, CT (US)

(72) Inventors: Wencheng Wu, Webster, NY (US); Yao Rong Wang, Webster, NY (US); Graham Pennington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 164 days.

(21) Appl. No.: 13/963,200

(22) Filed: Aug. 9, 2013

(65) Prior Publication Data

US 2015/0043771 A1  Feb. 12, 2015

(51) Int. Cl.
| | |
|---|---|
| *G06K 9/00* | (2006.01) |
| *G06K 9/32* | (2006.01) |
| *G06K 9/62* | (2006.01) |
| *G06T 7/20* | (2006.01) |
| *G08G 1/14* | (2006.01) |

(52) U.S. Cl.
CPC .......... *G06K 9/3233* (2013.01); *G06K 9/00711* (2013.01); *G06K 9/00771* (2013.01); *G06K 9/00785* (2013.01); *G06K 9/6256* (2013.01); *G06K 9/6267* (2013.01); *G06T 7/20* (2013.01); *G08G 1/14* (2013.01); *G06K 9/6262* (2013.01); *G06T 2207/10016* (2013.01); *G06T 2207/20081* (2013.01)

(58) Field of Classification Search
USPC .......................................................... 382/103
See application file for complete search history.

(56) References Cited

U.S. PATENT DOCUMENTS

| | | | |
|---|---|---|---|
| 6,285,297 B1 | 9/2001 | Ball | |
| 7,424,968 B2 | 9/2008 | Meyerhofer et al. | |
| 8,063,797 B1 * | 11/2011 | Sonnabend et al. | 340/932.2 |
| 8,108,055 B2 * | 1/2012 | Wong | 700/1 |

(Continued)

FOREIGN PATENT DOCUMENTS

| | | |
|---|---|---|
| EP | 1 895 486 B1 | 11/2009 |
| EP | 2 079 062 B1 | 8/2010 |

OTHER PUBLICATIONS

Felzenszwalb, P. F. et al., "Object Detection with Discriminatively Trained Part Based Models," IEEE Transactions on Pattern Analysis and Machine Intelligence (2010) 32(9):1627-1645.

*Primary Examiner* — Alex Liew
(74) *Attorney, Agent, or Firm* — Kermit D. Lopez; Luis M. Ortiz; Ortiz & Lopez, PLLC (57) ABSTRACT

Hybrid methods, systems and processor-readable media for video and vision based access control for parking occupancy determination. One or more image frames of a parking area of interest can be acquired from among two or more regions of interest defined with respect to the parking area of interest. The regions of interest can be analyzed for motion detection or image content change detection. An image content classification operation can be performed with respect to a first region of interest among the regions of interest based on the result of the image content change detection. An object tracking operation can then be performed with respect to a second region of interest among the regions of interest if the result of the image content classification operation indicates a presence of one or more objects of interest within the parking area of interest.

20 Claims, 9 Drawing Sheets

(56) References Cited

U.S. PATENT DOCUMENTS

| | | |
|---|---|---|
| 8,306,734 B2 | 11/2012 | Mathews |
| 8,432,297 B2 | 4/2013 | Sonnabend et al. |
| 8,698,895 B2* | 4/2014 | Nerayoff et al. ............... 348/148 |
| 2003/0053658 A1* | 3/2003 | Pavlidis ........................ 382/103 |
| 2003/0076417 A1* | 4/2003 | Thomas et al. ............... 348/169 |
| 2003/0123703 A1* | 7/2003 | Pavlidis et al. ............... 382/103 |
| 2004/0161133 A1* | 8/2004 | Elazar et al. .................. 382/115 |
| 2005/0201591 A1* | 9/2005 | Kiselewich ................... 382/104 |
| 2006/0167633 A1* | 7/2006 | Satonaka et al. ............. 701/300 |
| 2006/0227997 A1* | 10/2006 | Au et al. ....................... 382/103 |
| 2009/0123028 A1* | 5/2009 | Satonaka ...................... 382/103 |
| 2009/0243889 A1* | 10/2009 | Suhr et al. .................... 340/932.2 |
| 2010/0013656 A1* | 1/2010 | Brown et al. ................. 340/686.6 |
| 2010/0066825 A1* | 3/2010 | Kuboyama et al. ........... 348/118 |
| 2011/0210868 A1* | 9/2011 | Yano et al. .................... 340/932.2 |
| 2012/0099765 A1* | 4/2012 | Zheng ........................... 382/103 |
| 2012/0284146 A1 | 11/2012 | Wong |
| 2013/0101171 A1 | 4/2013 | Bulan et al. |
| 2013/0179383 A1 | 7/2013 | Pringle et al. |
| 2013/0315443 A1* | 11/2013 | Kim .............................. 382/103 |
| 2014/0376769 A1* | 12/2014 | Bulan et al. ................... 382/103 |
| 2015/0043771 A1* | 2/2015 | Wu et al. ....................... 382/103 |

* cited by examiner

HYBRID METHOD AND SYSTEM OF VIDEO AND VISION BASED ACCESS CONTROL FOR PARKING STALL OCCUPANCY DETERMINATION

FIELD OF THE INVENTION

Embodiments are generally related to parking management systems. Embodiments are also related to techniques and systems for providing real-time occupancy data to drivers to reduce fuel consumption and traffic congestion. Embodiments further relate to video and vision based access control methods and systems.

BACKGROUND

Parking management systems are being proposed that provide real-time parking occupancy data to drivers to reduce fuel consumption and traffic congestion. In the context of parking stall occupancy determination, there are various levels of performance metric that must be met depending on the desired applications. For example, one level of performance metric is measured by the accuracy of the total number of spaces available in a parking lot over time. This total number of spaces available can be considered as the lowest (i.e., most achievable) level of information for this application, but also provides the most common and useful information.

Another level of information involves the total number of spaces available for each floor in a parking building (indoors) or the total number of spaces available for each isle/isle-pair (outdoors). This can be useful for providing efficient navigation to a parker entering a large parking lot. The highest level of information can be the state of each parking stall (where are all those available spaces) in the parking lot. If accurate information can be achieved in this level, it opens up several additional applications such as mining parking patterns for better management and configuration, managing/monitoring unexpected parking capacity reduction due to poorly parked vehicles or poor weather condition (snow piled up), etc. Furthermore, high-level information can be easily aggregated to yield the lower level information by a simple summation.

Given such reasons, one would argue why not only develop methods that perform well in providing the highest level information. There are many reasons. For example, many applications require only the lowest level of information. Also, the problem becomes more complex when providing the highest-level of information. There are still many unsolved issues from the perspective of accuracy. Additionally, the computation for methods that aims to determine the individual occupancy of each stall in a lot is much more expensive. There is still a big gap in effectively making them operate in real-time. Other reasons include the fact that the image/video acquisition for methods that aim to determine the individual occupancy of each stall in a parking lot typically requires higher spatial resolutions to perform well (e.g., more expensive camera, higher data rate to deal with). Still, another reason involves the fact that a module that can accurately determine the lower-level information (e.g., total occupancy of a lot) can be helpful in improving a method aiming to provide higher-level information.

Given these reasons, it would be helpful to develop methods for providing highest/higher level of information for parking applications. It is also beneficial to develop methods to provide total occupancy of a parking lot to address the immediate needs of customers.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved parking management methods, systems and processor-readable media.

It is another aspect of the disclosed embodiments to provide methods, systems and processor-readable media for analyzing a region of interest and data thereof for use in parking management and access control.

It is a further aspect of the disclosed embodiments to provide for a hybrid method, system and processor-readable medium of video and vision based access control for parking stall (e.g., parking spot/parking lot) occupancy determination.

Embodiments are generally related to parking management systems. Embodiments are also related to techniques and systems for providing real-time occupancy data to drivers to reduce fuel consumption and traffic congestion. Embodiments further relate to video and vision based access control methods and systems.

The aforementioned aspects and other objectives and advantages can now be achieved as described herein. Hybrid methods, systems and processor-readable media for video and vision based access control for parking occupancy determination is described. One or more image frames of a parking area of interest can be acquired from among two or more regions of interest defined with respect to the parking area of interest. The two or more regions of interest defined within the parking area of interest can be analyzed for motion detection or change detection. An image content classification operation can be performed with respect to a first region of interest among the two or more regions of interest based on a result of the change detection. An object tracking operation can then be performed with respect to a second region of interest among the two or more regions of interest if a result of the image content classification operation indicates a presence of an object of interest within the parking area of interest to thereafter determine a type of access authorized with respect to the parking area of interest and based on a result of the object tracking operation.

The disclosed embodiments generally describe a hybrid approach of video and vision-based access control for parking stall occupancy determination. This approach can include the following steps: (1) defining at least two regions of interest (ROIs) within a parking area of interest for video and vision based access control, (2) acquiring image frame(s) of the parking area, (3) analyzing the first defined ROI for motion detection or image content change detection, (4) optionally, training a vision-based image content classification for the first defined ROI, (5) performing image content classification for the first defined ROI based on the result of change detection in step #3, (6) performing object tracking within the second defined ROI if the result of the image content classification indicating the presence of an object of interest, and (7) determining the access type based on the tracking result of the object of interest.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

Throughout the following discussion, numerous references will be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium. For example, a server can include one or more computers operating as a web server, database server, or other type of computer server in a manner to fulfill described roles, responsibilities, or functions. Within the context of this document, the disclosed printers, assemblies, or space craft are also deemed to comprise computing devices having a processor and a non-transitory memory storing instructions executable by the processor that cause the device to control, manage, or otherwise manipulate the features of the assemblies.

Figure 1:
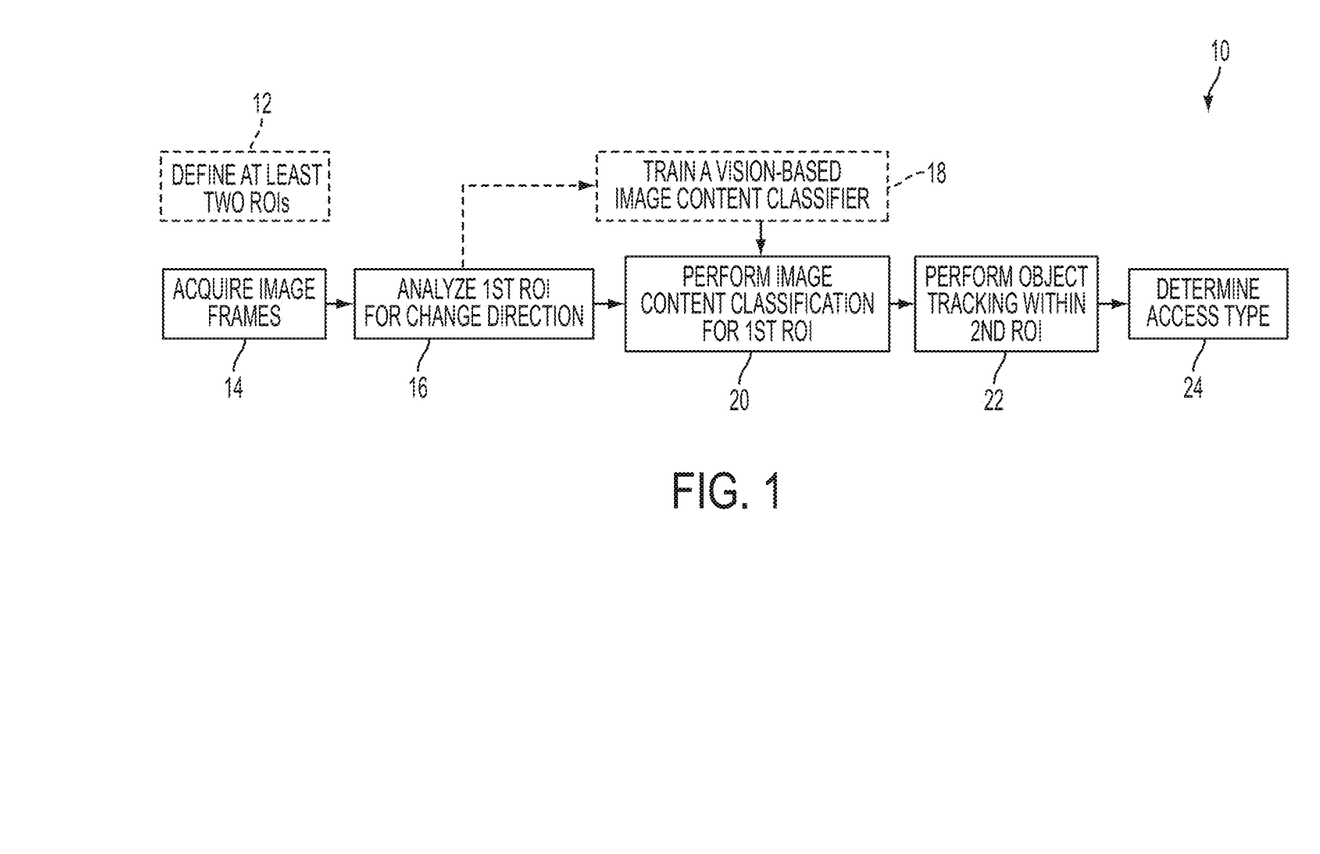
FIG. 1 illustrates a hybrid method of video and vision based access control for parking stall occupancy determination, in accordance with a preferred embodiment.

FIG. 1 illustrates a hybrid method 10 of video and vision based access control for parking stall occupancy determination, in accordance with a preferred embodiment. A flow chart of operations is thus generally shown in FIG. 1 depicting the logical operational steps or instructions of method 10. As indicated at block 12, at least two regions of interest (ROIs) can be defined within a parking area of interest for video and vision based access control. As shown at block 14, a logical operation or step can be provided for acquiring image frame (s) of the parking area. Next, as depicted at block 16, a step or logical operation can be implemented to analyze the first defined ROI for motion detection or image content change detection. Thereafter, as shown at block 18, an optional step or operation can be implemented to train a vision-based image content classification for the first defined ROI based on the result of change detection (see block 16) and ground truth labeling. As indicated at block 20, a step or logical operation can be implemented to perform an image content classification for the first defined ROI based on the result of change detection derived (see block 16). Following processing of the operation shown at block 20, a step or logical operation can be performed as illustrated at block 22 to implement object tracking within the second defined ROI, if the result of the image content classification indicating the presence of an object of interest. Finally, as described at block 24, a step or logical operation can be implemented to determine the access type based on the tracking result of the object of interest.

Regarding the step or logical operation of defining at least two regions of interest (ROIs) within a parking area of interest as shown in block 12 of FIG. 1, two or more regions of interest (i.e., at least two ROIs) can be defined within the parking area of interest, where the first defined ROI is used for initiation of the tracking of objects of interest (for this application this means presence of vehicles) and the second defined ROI is used for performing object tracking for those objects of interest. Optionally, a sub-region can be further defined within the first defined ROI to make the initiation of tracking more difficult (i.e. limit the number of initiation unless it is very certain that an object of interest is reaching the sub-region).

Figure 2:
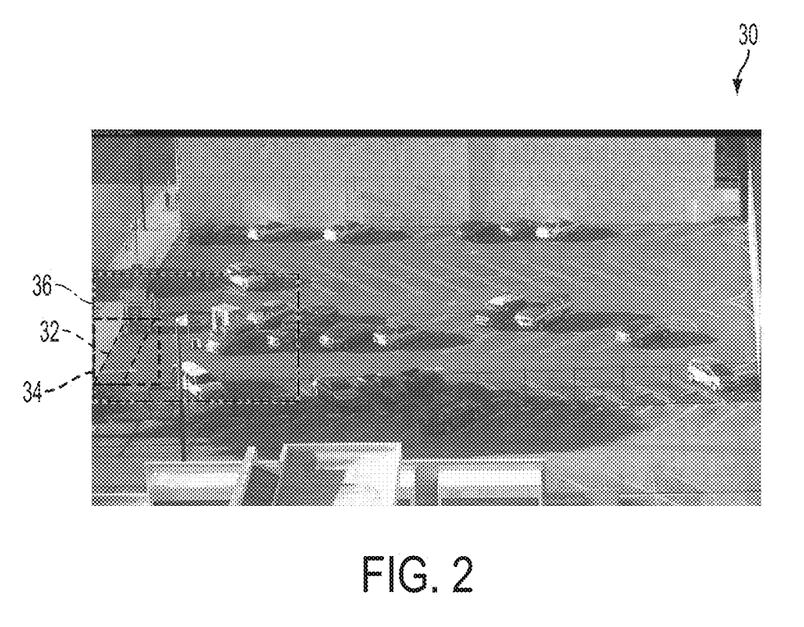
FIG. 2 illustrates an example image in which at least two ROIs are defined and utilized for analyzing site videos, in accordance with the disclosed embodiments.

FIG. 2 illustrates an example image 30 of a first defined ROI 34 (i.e., the smaller dashed box), a second defined ROI 36 (i.e., the larger dashed box), and a sub-region within first ROI 32 (i.e., the parallelogram) for an example site, in accordance with the disclosed embodiments. The parallelogram ROI 32 defines the entrance area of this particular parking lot. However, it is more convenient to define a rectangular shaped ROI 34 (the smaller box) for vision-based image content classifier to be discussed later. Thus, the first defined ROI 34 can be set to the larger box rather than the parallelogram ROI 32, but the disclosed method can also use (optionally) the parallelogram for initiation of object tracking. The second defined ROI 36 can be utilized for tracking a vehicle entering or exiting the parking lot. Hence, it is set large enough to cover all possible paths of access of this lot. Ideally, one would set the second ROI 36 to cover the region just outside the lot (i.e. place the blue box such that the red box is in the center) as well. Since the camera configuration of this example site does not allow such optimal placement, a sub-optimal placement of ROI 36 is defined and shown in the example scenario depicted in FIG. 2. Note that this step of defining ROIs can be performed offline and only once if the camera configuration is fixed.

Regarding the step of acquiring image frame(s) of the parking area as shown in block 14, at run-time the image frames of the parking area can be continuously acquired and then further processed in subsequent steps to determine the total occupancy of the parking area of interest over time. Note that this approach can provide the total count of vehicles in the lot via controlling/monitoring the access of the entrance (thus referred to as access control throughout this document).

Regarding the step of analyzing the first defined ROI for motion detection or image content change detection as shown at block 16, in this step the image content of the first defined ROI can be analyzed to detect temporal changes within the ROI. If detected, this indicates a potential change of total occupancy of the parking area. There are multiple ways to perform change detection.

For example, one approach involves monitoring the color changes over time to detect image content changes. One can compute and store temporal RGB profiles, wherein each RGB point in time corresponds to the calculated average RGB values for all pixels in the first defined ROI. A temporally low-passed or median-filtered version can then be computed to represent the illumination changes in the ROI not due to the presence of object(s) in the ROI scene. Finally, changes can be detected based on the difference between the two set of profiles.

Another approach involves, for example, performing motion detection over time to detect image content changes (i.e., a preferred method). For example, one can perform motion detection for current frame using frame-to-frame difference or background subtraction method in conjunction with morphological filtering and amplitude and/or size thresholding. If there is a detected motion blob, a potential change of image content can be declared. Note that if motion detection is used for change detection in the $1^{st}$ ROI, this step can be performed jointly with object tracking in the $2^{nd}$ ROI since it requires motion detection as well but at a different region.

These techniques explore temporal correlation between frames and thus can be referred as video-based approaches. Such techniques are also sometimes referred as involving a virtual loop sensor since the operation counts how many events (i.e., changes) occur without further information. These techniques are very efficient in computation; however, they present technical challenges when employing the aforementioned methods alone for change detection. For example, errors due to the low contrast of the object to background (i.e. either due to the color of the object or illumination of the scene) may result. Also, errors due to moving objects not of interest (e.g., shadow of moving vehicle on the main road, people or group of people+their shadow) may also result.

Though some tuning of amplitude (e.g., dynamically change the threshold to adapt to the illumination of the scene) and/or size threshold may be implemented, there are still trade-offs between false-positive and false-negative results. Instead, the disclosed methodology, including systems thereof, is capable of tuning the threshold to bias strongly to false-positive and then incorporate vision-based image content classification to filter out those false-positives from true-positives. In simple terms, we first allow errors in mistakenly including moving shadows, moving groups of people and shadows, etc. (i.e. false positives) so that no/rarely moving vehicle (i.e. true positives) will be missed. Then, we further impose a process that can be run much like human vision system to recognize whether the object of interest is a vehicle or a non-vehicle.

Regarding optional step or logical operation of optionally training a vision-based image content classification for the first defined ROI based on the result of change detection and ground truth labeling, as shown at block 16 of FIG. 1, a vision-based image content classifier can be trained to recognize whether a portion of or a full vehicle is present in the $1^{st}$ ROI. Once a satisfactory classifier has been trained, we do not need to perform this step in the daily analysis, which is why this particular step is considered optional.

Here, a standard machine learning approach can be followed for training the disclosed classifier. That is, we define features, collect positive and negative samples, and then train the classifier. However, there are some specific practical differences that are worth mentioning or discussing. The classifier we train here can be, for example, a linear HOG-SVM classifier, which has proven to be effective in many object recognition/detection tasks. It can be appreciated, of course, that other types of classifiers may be employed instead of the linear HOG-SVM classifier.

In any event, for a typical object recognition/detection task, one needs to detect the presence of the object and locate it. Therefore, the positive training samples can be collected by cropping exactly to the boundary of the object while the negative samples can be any relevant random crops from images in scope. At run-time, a sliding window approach at various scales can be used to detect the object of interest in the test images. In one possible scenario, we may be only interested in classifying the image content of the $1^{st}$ROI to vehicle present vs. no vehicle present. At run-time, no sliding window is needed. This is much simpler in collecting training samples and truth-labeling since: (1) no manual cropping is needed, i.e. training samples are simply the cropped image of $1^{st}$ ROI collected from various times of the day and/or across various days, and (2) ground-truth labeling is as simple as asking a human to label whether he/she sees a vehicle in the cropped image.

At a glance, it may seem that the task of the disclosed classifier is simpler than typical object recognition/detection tasks. This may not be true since within the $1^{st}$ ROI the presence of a vehicle can be partial, at various poses, and at various locations in the ROI. The same holds true with moving shadows and walking people(s). This would increase the variety of image content in training samples (positive or negative) and thus would make the classification task harder. To deal with this, we incorporate the analysis of video-based change detection into the vision-based classifier (thus the name "a hybrid of video-based and vision-based approach") by collecting samples (positive or negative) only if change is detected by video-based method. By doing so, the disclosed image content classifier can be tuned to specialize only in the area of differentiating moving vehicle in the ROI vs. moving non-vehicle in the ROI rather than a general scope of differentiating between vehicle in the scene vs. not.

Figure 3A:
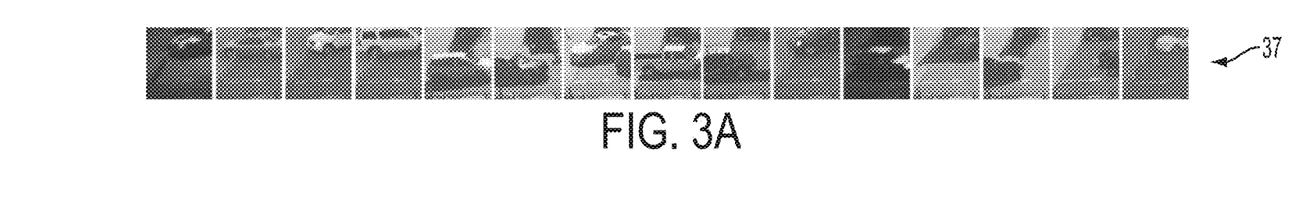
FIGS. 3A and 3B illustrate images respectively depicting positive and negative samples collected from a pilot site, in accordance with example embodiments.
Figure 3B:
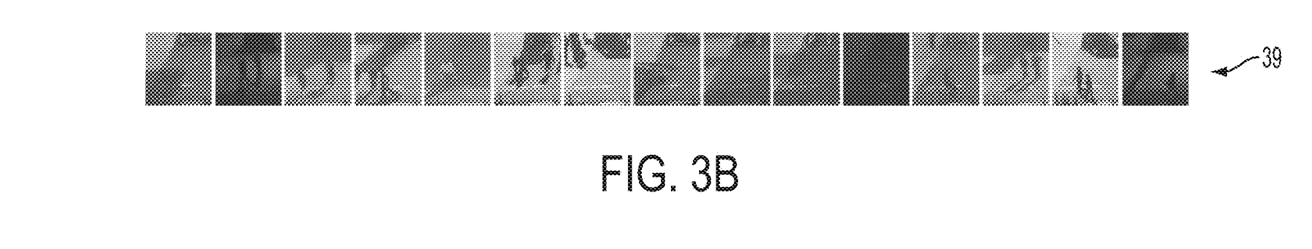

FIG. 3 illustrates example images 37, 39 of positive and negative samples collected from a pilot site, in accordance with the disclosed embodiments. Note that in practice, the training (mainly sample collection and labeling) of our proposed image content classifier is very efficient with very little cost of human effort. For a given parking site of interest, we can perform the steps shown in blocks 12, 14, 16, 18 on a video(s) of the site. Whenever a change is detected in video-based processing (i.e., see block 16 in FIG. 1), an image of the $1^{st}$ ROI can be saved. After enough samples are saved, a human can quickly examine the image thumbnail to label each of them as with vehicle present or without vehicle present (no further cropping is needed). As shown in FIG. 3, this task is very simple and can be done very efficiently (e.g., it only takes a few minutes to label several hundred images for a typical operator). Note that to collect more samples out of a period of time, one can also vary the thresholds determined for change detection (e.g., see block 16 of FIG. 1) to collect more poses and positions of the same vehicle show up in the $1^{st}$ ROI.

Regarding the step or logical operation of performing image content classification for the first defined ROI based on the result of change detection in block 16, as shown at block 20 of FIG. 1, at run-time this step can be performed when a change of image content in the $1^{st}$ ROI is detected in the video-based processing of the operation of block 16. That is, this process simply converts the image of the $1^{st}$ ROI to HOG feature space and passes it through the trained linear SVM to declare whether vehicle(s) is present in the $1^{st}$ ROI. If yes, we will continue the process next for tracking. If no, no further process is necessary and the methodology continues to process the next video frame.

Regarding the step or logical operation of performing object tracking within the second defined ROI if the result of the image content classification indicates the presence of an object of interest, as illustrated at block 22 of FIG. 1, in this step object tracking can be performed within the $2^{nd}$ ROI after an object of interest is present in $1^{st}$ ROI, i.e. the tracking is initiated in the step or logical operation illustrated by block 22. Many object tracking algorithms such as proximity match of motion blobs, mean-shift tracking, particle-filtering tracking, etc., can be employed here. We use proximity match of motion blobs for this work due to its simplicity and computational advantage. This is sufficient since we are only interested in enough tracking detail for next step to determine whether it is an entering or exiting action.

Note that in the current configuration depicted in FIG. 2, wherein the camera field of view does not cover enough area outside the lot, it may be necessary in some cases to back track (traverse the object tracking in the past) vehicles once a tracking is initiated (especially for vehicle exiting the lot). To enable this operation, a buffer (e.g., up to 30 seconds from current frame) can be maintained to store the detected motion blobs in the past. As a result, this step is always run to fill in the buffer regardless of the outcome of the operations depicted at blocks 16 and 22. The detected blob in the buffer will be thrown away if not used by back track after some time (e.g., 30 seconds). If the camera configuration is better optimized for this application, then the computation and robustness will be improved against current implementations. This is, however, not a limitation of the disclosed embodiments.

Note that for the step of determining the access type based on the tracking result of the object of interest, the access type can be calculated by entering or exiting in this application based on the tracking result of the detected change event (i.e. after an event is initiated by a presence of vehicle(s) in $1^{st}$ ROI). The simplest rule for this step is to check whether the final available tracking point is inside or outside the lot area. In a current configuration, where the camera field of view does not cover enough area outside the lot, this is not a good strategy. Furthermore, the tracking may be noisy. Instead, a smoothing can be performed on the resulting tracked trajectory and then the access type is determined based on the direction and the travel distance of the smoothed trajectory.

Some key differences between the disclosed approach and conventional methodologies are twofold: (1) they (i.e., conventional approaches) are video-based; not a hybrid of video-based and vision-based as discussed earlier; and (2) we augment our virtual loop with local tracking information. Without (2), a typical virtual loop concept requires a pair of loops and uses the order of timing occurring among the pair of loops to determine the access type. This can be difficult in a setting where some drivers park the vehicle first and then go to the booth to pay, while others park the vehicle near the booth to pay first then park (timing is very different between the two). As a result, it may be difficult to decide where the pair of loops should be, how far apart, and what an appropriate timing is, etc. The disclosed embodiments thus represent a better alternative and involves less development time.

One may ask why not just use vision-based approaches for this work? The reasons are as follows. First, the vision-based method is computationally more expensive. It does not make sense to run vision-based classifiers on the $1^{st}$ ROI for every frame if one is sure that the image content has not changed since last execution. Even if computation is affordable, the vision-based classifier discussed herein needs to be modified to deal with background changes due to scene illumination or other variations that were not pre-filtered by video-based motion detection. This would make the task of classification more challenging (as discussed earlier) and thus may degrade the overall performance in the end.

A sample frame of the acquired video of the site of interest is depicted in the example illustrated in FIG. 2. The defined ROIs used in this scenario are also shown in FIG. 2. For video-based processing (e.g., block 16 of FIG. 1), the dynamic threshold on the amplitude can be used based on the average background RGB of the $1^{st}$ ROI at current frame, while using a constant size-threshold. The thresholds are biased to allow false-positives while minimizing the occurrence of false-negatives. The image content classifier discussed earlier herein can be trained using the data collected from one of the test videos using the method discussed earlier (e.g., about 1800 training samples collected in a day of video using different threshold levels for motion detection). The classifier can then be applied for processing all test videos. Examples of training samples are shown in FIG. 3. The motion detection can be run for all frames so that a running buffer of motion blobs can be stored for back tracking while the object tracking is only performed after an initiation. The reason of doing so is discussed previously.

Figure 4A:
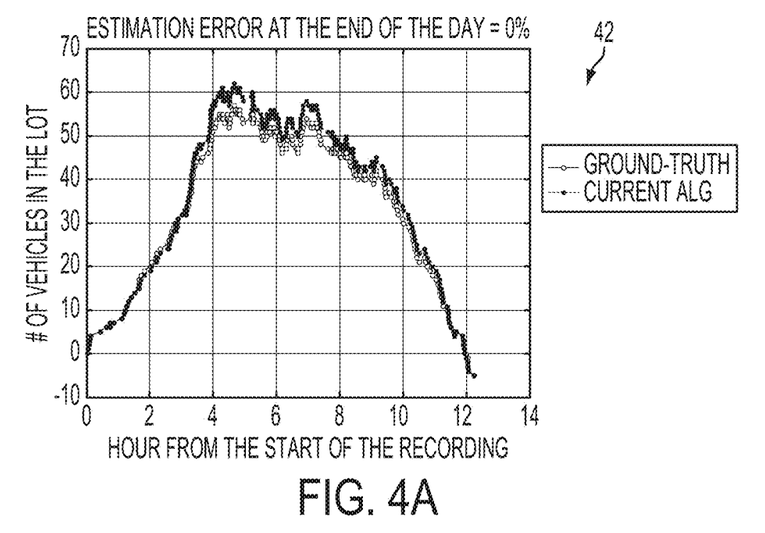
FIGS. 4A and 4B illustrate graphs depicting the resulting performance on total occupancy using the disclosed approach against the ground-truth: (a) result on day 5, and (b) result on day 9, in accordance with example embodiments.
Figure 4B:
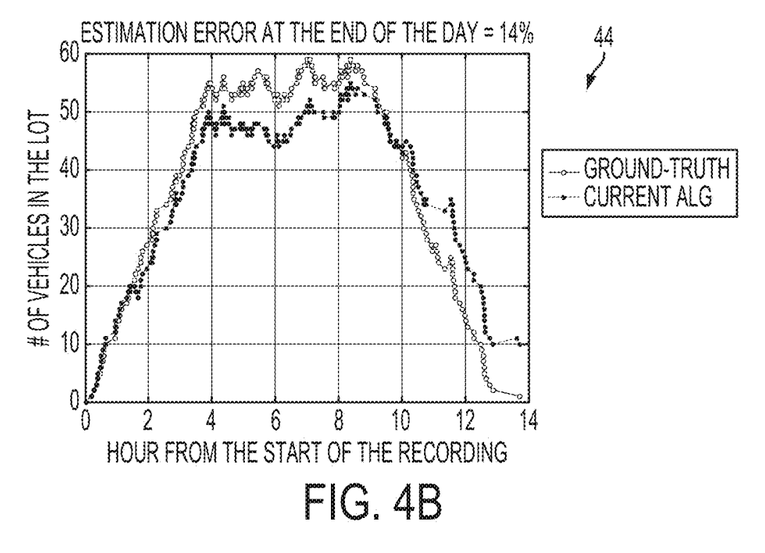

FIGS. 4A and 4B illustrate graphs 42, 44 depicting the resulting performance on total occupancy using the disclosed approach against the ground-truth: (a) result on day 5, and (b) result on day 9, in accordance with particular embodiments. FIGS. 4A and 4B depict two examples of the resulting performance on total occupancy using our algorithm against the ground-truth. Here, the result on day 5 is one of the best in performance, while result on day 9 is the worst in performance.

Figure 5A:
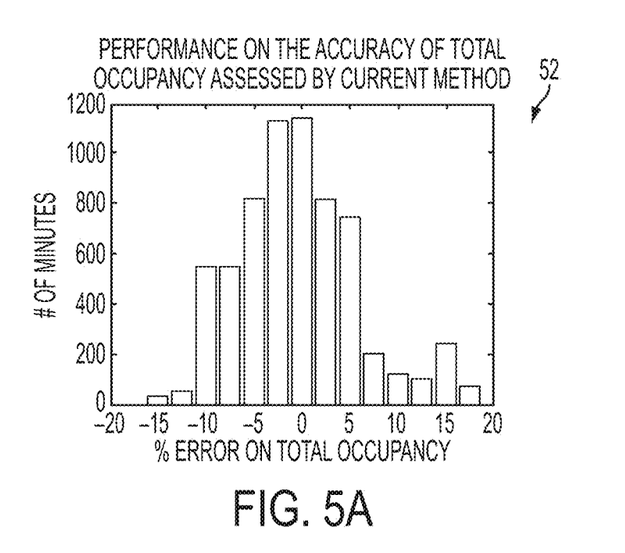
FIGS. 5A and 5B illustrate graphs plotting data indicative of the overall performance of the current system over all 9 videos: (a) assessed in 1-minute interval, and (b) assessed in 0.5-minute interval, in accordance with example embodiments.
Figure 5B:
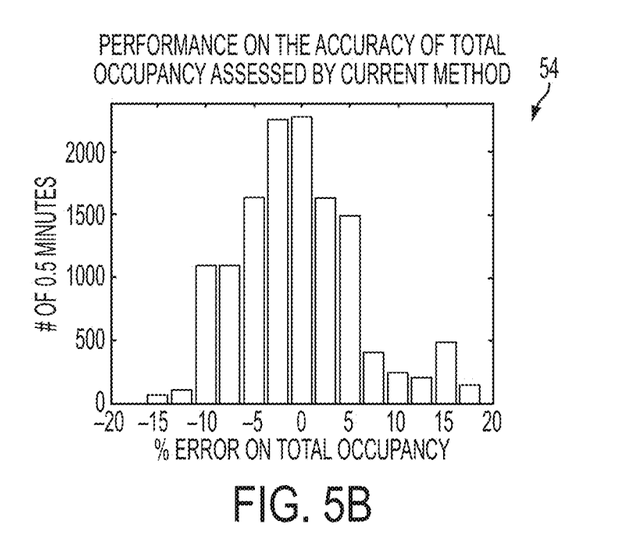

FIGS. 5A and 5B illustrates graphs 52, 54 plotting data indicative of the overall performance (e.g., percent error in determining the total occupancy of the parking lot) of the current system over all test videos: (a) assessed in 1-minute interval and (b) assessed in 0.5-minute interval, in accordance with particular embodiments. FIGS. 5A and 5B demonstrate the overall performance of the current system over all test videos (days). The performance is assessed in the following fashion. For each day, a sampling of one minute (i.e., graph 52) is used to assess the accuracy of total occupancy estimated by our system. For a given minute of interest, the true total occupancy is obtained by table loop up of the solid curve shown in FIGS. 4A and 4B, while the estimated total occupancy is obtained by table loop up of the dashed curve shown in FIGS. 4A and 4B. The percent error in estimating the total occupancy is then calculated by the difference of the two divided by 65 (capability of this parking lot) and then multiplied by 100 (to convert to percent). Note that this selected assessment method allows a system to have a delay of one minute. An assessment of 0.5-minute sampling (should be sufficient for real-time application) is shown in graph 54. As can be seen in FIGS. 5A and 5B, the performance is almost the same. The intrinsic delay of our system comes from the tracking of the object. Current implementation stops tracking when the object leaves the $2^{nd}$ ROI or when it stops moving for more than 2 seconds. This would result in a few second of delay, but not an issue for this application.

Figure 6:
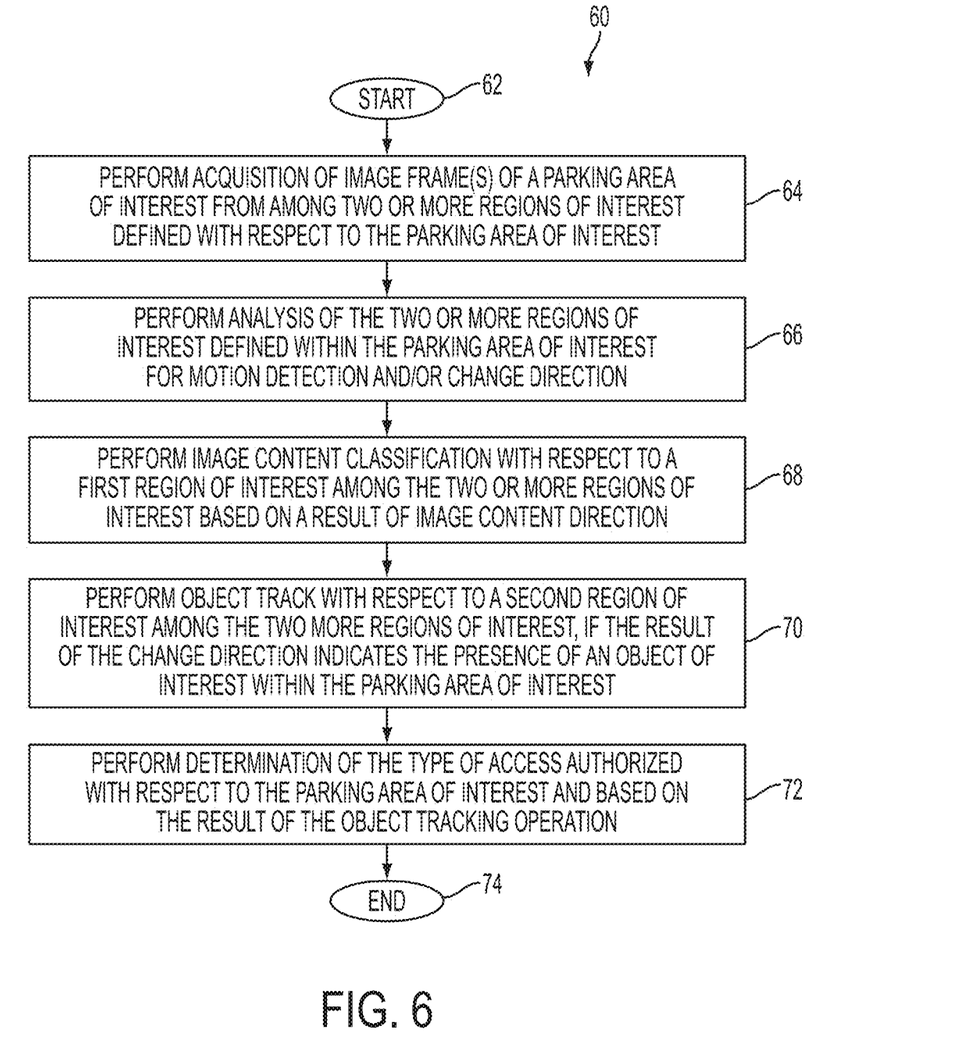
FIG. 6 illustrates a high-level flow chart of operations depicting logical operational steps of a hybrid method of video and vision based access control for parking stall (e.g., parking spot) occupancy determination, in accordance with an alternative embodiment.

FIG. 6 illustrates a high-level flow chart of operations depicting logical operational steps of a hybrid method 60 of video and vision based access control for parking stall (e.g., parking spot) occupancy determination, in accordance with an alternative embodiment. As indicated at block 62, the process can be initiated. As described next at block 64, a step or logical operation can be performed to acquire image frame (s) of a parking area of interest from among two or more regions of interest defined with respect to the parking area of interest. Thereafter, as illustrated at block 66, a step or logical operation can be performed to analyze the two or more regions of interest defined within the parking area of interest for motion detection and/or change detection.

Then, as shown at block 68, a step or logical operation can be implemented to perform an image content classification operation with respect to a first region of interest among the two or more regions of interest based on a result of change detection. Thereafter, as described at block 70, an objected tracking step or logical operation can be performed with respect to a second region of interest among the two more regions of interest, if the result of the image content classification indicates the presence of an object of interest within the parking area of interest. Then, as depicted at block 72, a step or logical operation can be performed to determine the type of access authorized with respect to the parking area of interest and based on the result of the object tracking operation. The process can then terminate, as shown at block 74.

Figure 7:
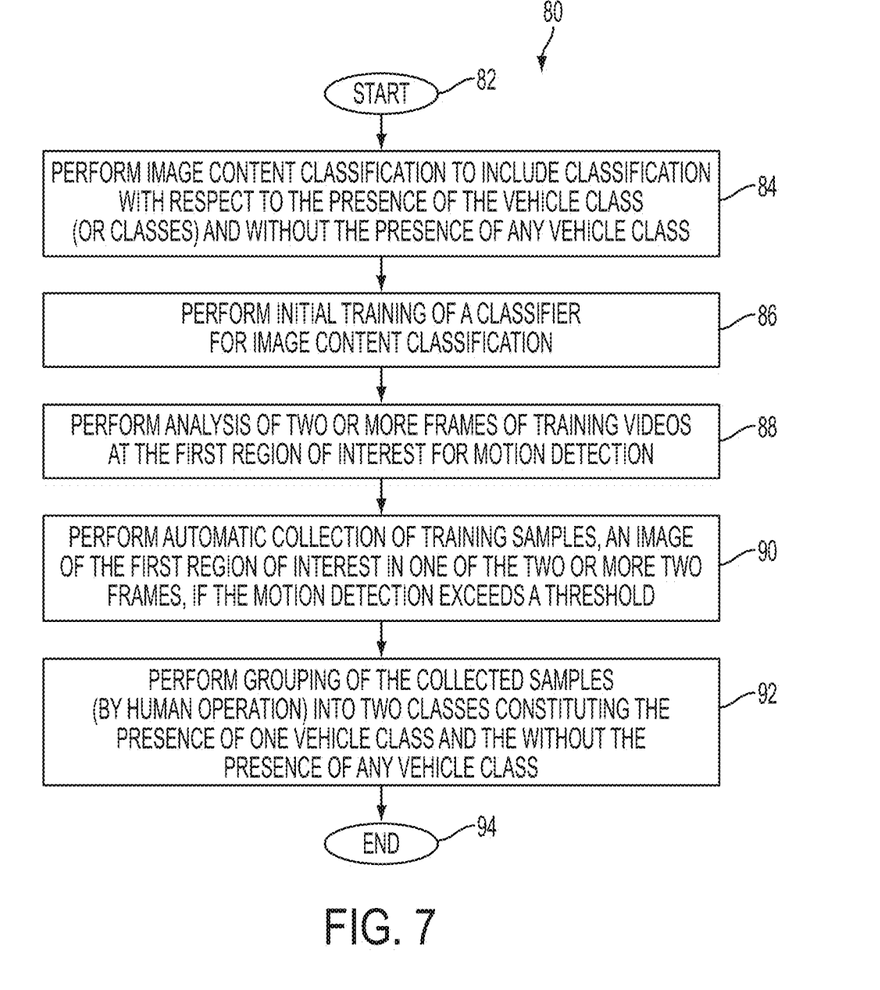
FIG. 7 illustrates a high-level flow chart of operations depicting logical operational steps of a hybrid method of video and vision based access control for parking stall (e.g., parking spot) occupancy determination, in accordance with an alternative embodiment.

FIG. 7 illustrates a high-level flow chart of operations depicting logical operational steps of a hybrid method 80 of video and vision based access control for parking stall (e.g., parking spot) occupancy determination, in accordance with an alternative embodiment. Note that the operations shown in FIG. 7 can be supplemental to the operations or steps of method 60 shown in FIG. 6. That is, the method 80 shown in FIG. 7 can complement the method 60 of FIG. 6. Thus, the process can begin, as depicted at block 82. Then, as shown at block 84, a step or logical operation can be performed to ensure that the image content classification includes classification with respect to the presence of the vehicle class (or classes) and without the presence of any vehicle class. Then, as indicated at block 86, a step or logical operation can be implemented to initiate training of a classifier for performing image content classification.

Thereafter, as described at block 88, a step or logical operation can be performed to analyze two or more frames of training videos at the first region of interest for motion detection. Next, a step or logical operation can be implemented as shown at block 90, to automatically collect training samples, an image of the first region of interest in one of the two or more two frames, if the motion detection exceeds a threshold. Then, as indicated at block 92, a step or logical operation can be implemented to group the collected samples (e.g., by human operation) into two classes constituting the presence of one or more vehicle classes and without the presence of any vehicle class. The process can then terminate, at shown at block 94.

The embodiments are described at least in part herein with reference to flowchart illustrations and/or block diagrams of methods, systems, and computer program products and data structures according to embodiments of the invention. For example, FIG. 1 and FIGS. 6-7 illustrate such methods. It will be understood that each block of the illustrations, and combinations of blocks, can be implemented by computer program instructions. These computer program instructions may be provided to a processor of a general-purpose computer, special purpose computer, or other programmable data-processing apparatus to produce a machine such that the instructions, which execute via the processor of the computer or other programmable data-processing apparatus, create means for implementing the functions/acts specified in the block or blocks discussed herein such as, for example, the various instructions discussed and shown with respect to the figures herein.

These computer program instructions may also be stored in a computer-readable memory that can direct a computer or other programmable data-processing apparatus to function in a particular manner such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 8:
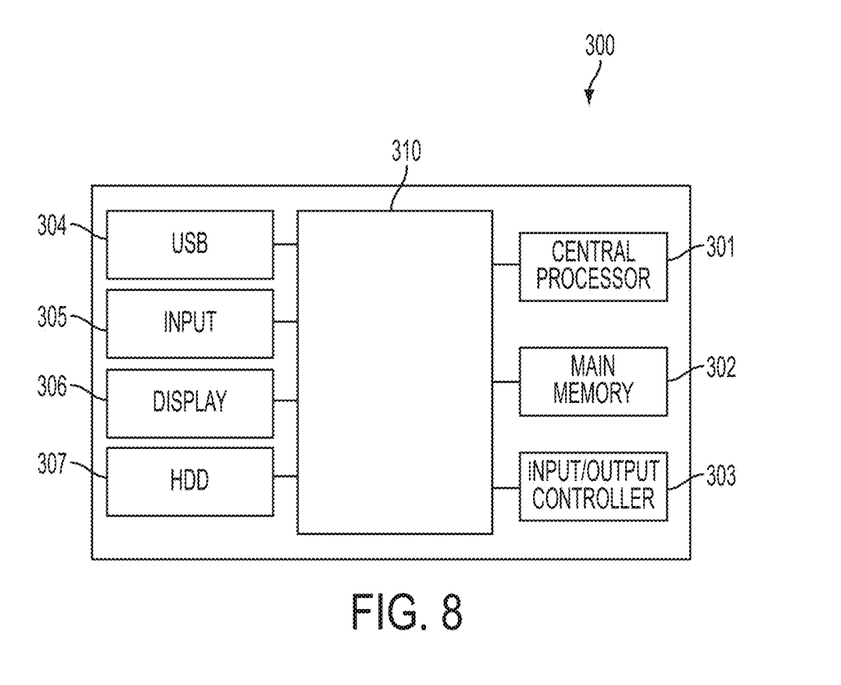
FIG. 8 illustrates a schematic view of a computer system, which can be implemented in accordance with one or more of the disclosed embodiments.
Figure 9:
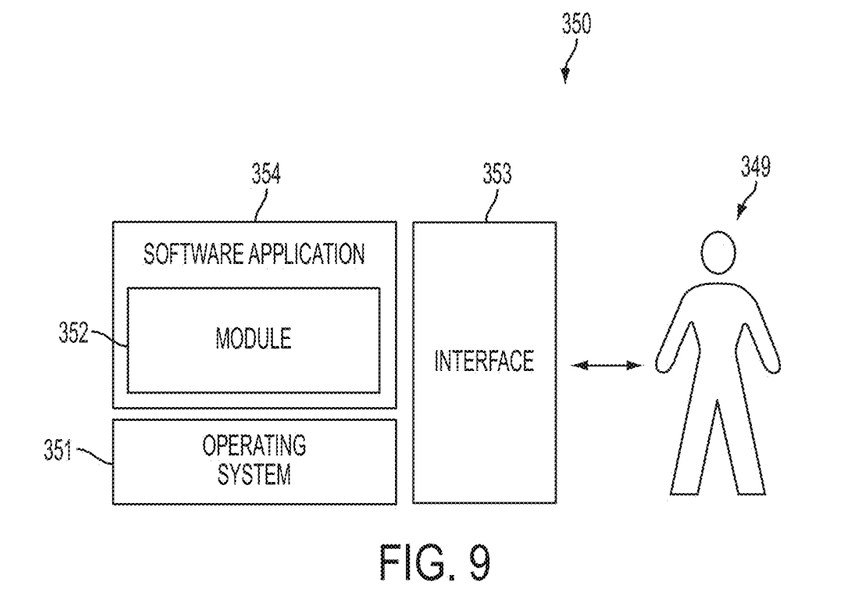
FIG. 9 illustrates a schematic view of a software system including an anomaly detection module, an operating system, and a user interface, in accordance with one or more embodiments.

FIGS. 8-9 are provided as exemplary diagrams of data-processing environments in which embodiments of the present invention may be implemented. It should be appreciated that FIGS. 8-9 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments. Note that FIGS. 8-9 generally illustrate a data-processing system in which embodiments may be implemented (e.g., such as an "app"). FIGS. 8-9 are thus representative of a variety of different types of data-processing systems and devices including, for example, servers, laptop computers, Smartphones, "pad" or tablet computing devices, desktop computers, and other computing devices.

As illustrated in FIG. 8, the disclosed embodiments may be implemented in the context of a data-processing system 300 that can include, for example, a central processor 301 (or other processors), a main memory 302, a controller 303, and in some embodiments, a USB (Universal Serial Bus) 304 or other appropriate peripheral connection. System 300 can also include an input device 305 (e.g., a keyboard, pointing device such as a mouse, etc.), a display 306, and a HDD (Hard Disk Drive) 307 (e.g., mass storage). As illustrated, the various components of data-processing system 300 can communicate electronically through a system bus 310 or similar architecture. The system bus 310 may be, for example, a subsystem that transfers data between, for example, computer components within data-processing system 300 or to and from other data-processing devices, components, computers, etc.

FIG. 9 illustrates a computer software system 350, which may be employed for directing the operation of the data-processing system 300 depicted in FIG. 8. Software application 354, stored in memory 302 and/or on HDD 307 generally can include and/or can be associated with a kernel or operating system 351 and a shell or interface 353. One or more application programs, such as module(s) 352, may be "loaded" (i.e., transferred from mass storage or HDD 307 into the main memory 302) for execution by the data-processing system 300. In the example shown in FIG. 9, module 352 can be implemented as, for example, a software module that performs the logical instructions or operations of for example, blocks 12, 14, 16, 18, 20, 22, 24 of FIG. 1, blocks 62, 64, 66, 68, 70, 72, 74 of FIG. 6, and blocks 82 84, 86 88, 90, 92, 94 of FIG. 7 and so forth.

The data-processing system 300 can receive user commands and data through user interface 353 accessible by a user 349. These inputs may then be acted upon by the data-processing system 300 in accordance with instructions from operating system 351 and/or software application 354 and any software module(s) 352 thereof.

The discussion herein is thus intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules (e.g., module 352) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (e.g., accessible only to that module) and which includes source code that actually implements the routines in the module. The term module may also simply refer to an application such as a computer program designed to assist in the performance of a specific task such as word processing, accounting, inventory management, etc.

The interface 353 (e.g., a graphical user interface) can serve to display results, whereupon a user may supply additional inputs or terminate a particular session. In some embodiments, operating system 351 and interface 353 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 351 and interface 353.

FIGS. 8-9 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Based on the foregoing, it can be appreciated that a number of embodiments, preferred and alternative, are disclosed herein. For example, in a preferred embodiment, a hybrid method of video and vision based access control for parking occupancy determination can be implemented. Such a method can include, for example, the steps or logical operations of acquiring at least one image frame of a parking area of interest from among at least two regions of interest defined with respect to the parking area of interest; analyzing the at least two regions of interest defined within the parking area of interest for motion detection or change detection; performing an image content classification operation with respect to a first region of interest among the at least two regions of interest based on a result of the change detection; and performing an object tracking operation with respect to a second region of interest among the at least two regions of interest if a result of the image content classification operation indicates a presence of an object of interest within the parking area of interest to thereafter determine a type of access authorized with respect to the parking area of interest and based on a result of the object tracking operation.

In another embodiment, the parking area of interest may constitute at least one of a parking lot entrance or a parking lot exit. In another embodiment, the at least two regions of interest may be defined with respect to the parking area of interest. In another embodiment, a step or logical operation can be performed for training a vision-based image content classification with respect to the first region of interest for use in performing the image content classification operation. In still another embodiment, the image content classification can include classification with respect to the presence of at least one vehicle class and without a presence of any vehicle class.

In another embodiment, a step or logical operation for training a classifier for performing the image content classification can be implemented by analyzing at least two frames of training videos at the first region of interest for motion detection; automatically collect training samples, an image of the first region of interest in one of the at least two frames, if the motion detection exceeds a threshold; and grouping collected samples by human operation into two classes comprising the presence of the at least vehicle class and the without the presence of any vehicle class.

In yet another embodiment, steps or logical operations can be performed for smoothing a resulting tracked trajectory with respect to the object tracking operation to generate a smoothed trajectory and determining the type of access based on a direction and a travel distance of the smoothed trajectory.

In another embodiment, a hybrid system of video and vision based access control for parking occupancy determination can be implemented. Such a system can include, for example, a processor; a data bus coupled to the processor; and a computer-usable medium embodying computer program code, the computer-usable medium being coupled to the data bus. In some embodiments, the computer program code can include instructions executable by the processor and configured for: acquiring at least one image frame of a parking area of interest from among at least two regions of interest defined with respect to the parking area of interest; analyzing the at least two regions of interest defined within the parking area of interest for motion detection or change detection; performing an image content classification operation with respect to a first region of interest among the at least two regions of interest based on a result of the change detection; and performing an object tracking operation with respect to a second region of interest among the at least two regions of interest if a result of the image content classification operation indicates a presence of an object of interest within the parking area of interest to thereafter determine a type of access authorized with respect to the parking area of interest and based on a result of the object tracking operation.

In yet another embodiment, a processor-readable medium storing computer code representing instructions to cause a hybrid process of video and vision based access control for parking occupancy determination can be implemented. Such computer code can include code to, for example: acquire at least one image frame of a parking area of interest from among at least two regions of interest defined with respect to the parking area of interest; analyze the at least two regions of interest defined within the parking area of interest for motion detection or change detection; perform an image content classification operation with respect to a first region of interest among the at least two regions of interest based on a result of the change detection; and perform an object tracking operation with respect to a second region of interest among the at least two regions of interest if a result of the image content classification operation indicates the presence of an object of interest within the parking area of interest to thereafter determine a type of access authorized with respect to the parking area of interest and based on a result of the object tracking operation.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A hybrid method of video and vision based access control for parking occupancy determination, said method comprising:
    acquiring at least one image frame of a parking area of interest from among at least two regions of interest defined with respect to said parking area of interest;
    analyzing said at least two regions of interest defined within said parking area of interest for motion detection or content change detection;
    performing a vision-based image content classification operation with respect to a first region of interest among said at least two regions of interest based on a result of said content change detection; and
    performing an object tracking operation with respect to a second region of interest among said at least two regions of interest if a result of said vision-based image content classification operation indicates a presence of an object of interest within said parking area of interest to thereafter determine a type of access authorized with respect to said parking area of interest and based on a result of said object tracking operation.

2. The method of claim 1 wherein said parking area of interest comprises at least one of a parking lot entrance or a parking lot exit.

3. The method of claim 1 further comprising defining said at least two regions of interest with respect to said parking area of interest.

4. The method of claim 3 further comprising training said vision-based image content classification with respect to said first region of interest for use in performing said image content classification operation.

5. The method of claim 3 wherein said vision-based image content classification includes classification with respect to a presence of at least one vehicle class and without a presence of any vehicle class.

6. The method of claim 5 further comprising training a classifier for performing said image content classification by:
    analyzing at least two frames of training videos at said first region of interest for said motion detection;
    automatically collect training samples, an image of said first region of interest in one of said at least two frames, if said motion detection exceeds a threshold; and
    grouping collected samples by human operation into two classes comprising said presence of said at least vehicle class and said without said presence of any vehicle class.

7. The method of claim 6 further comprising:
    smoothing a resulting tracked trajectory with respect to said object tracking operation to generate a smoothed trajectory; and
    determining said type of access based on a direction and a travel distance of said smoothed trajectory.

8. A hybrid system of video and vision based access control for parking occupancy determination, said system comprising:
    a processor;
    a data bus coupled to said processor; and
    a computer-usable medium embodying computer program code, said computer-usable medium being coupled to said data bus, said computer program code comprising instructions executable by said processor and configured for:
        acquiring at least one image frame of a parking area of interest from among at least two regions of interest defined with respect to said parking area of interest;
        analyzing said at least two regions of interest defined within said parking area of interest for motion detection or content change detection;
        performing a vision-based image content classification operation with respect to a first region of interest among said at least two regions of interest based on a result of said content change detection; and
        performing an object tracking operation with respect to a second region of interest among said at least two regions of interest if a result of said vision-based image content classification operation indicates a presence of an object of interest within said parking area of interest to thereafter determine a type of access authorized with respect to said parking area of interest and based on a result of said object tracking operation.

9. The system of claim 8 wherein said parking area of interest comprises at least one of a parking lot entrance or a parking lot exit.

10. The system of claim 9 wherein said instructions are further configured for defining said at least two regions of interest with respect to said parking area of interest.

11. The system of claim 10 wherein said instructions are further configured for training said vision-based image content classification with respect to said first region of interest for use in performing said image content classification operation.

12. The system of claim 11 wherein said image content classification includes classification with respect to a presence of at least one vehicle class and without a presence of any vehicle class.

13. The system of claim 11 wherein said instructions are further configured for training a classifier for performing said image content classification by:

analyzing at least two frames of training videos at said first region of interest for motion detection;

automatically collect training samples, an image of said first region of interest in one of said at least two frames, if said motion detection exceeds a threshold; and grouping collected samples by human operation into two classes comprising said presence of said at least vehicle class and said without said presence of any vehicle class.

14. The system of claim 11 wherein said instructions are further configured for:

smoothing a resulting tracked trajectory with respect to said object tracking operation to generate a smoothed trajectory; and determining said type of access based on a direction and a travel distance of said smoothed trajectory.

15. A non-transitory processor-readable medium storing computer code representing instructions to cause a hybrid process of video and vision based access control for parking occupancy determination, said computer code further comprising code to:

acquire at least one image frame of a parking area of interest from among at least two regions of interest defined with respect to said parking area of interest;

analyze said at least two regions of interest defined within said parking area of interest for motion detection or content change detection;

perform a vision-based image content classification operation with respect to a first region of interest among said at least two regions of interest based on a result of said content change detection; and perform an object tracking operation with respect to a second region of interest among said at least two regions of interest if a result of said vision-based image content classification operation indicates a presence of an object of interest within said parking area of interest to thereafter determine a type of access authorized with respect to said parking area of interest and based on a result of said object tracking operation.

16. The processor-readable medium of claim 15 wherein said parking area of interest comprises at least one of a parking lot entrance or a parking lot exit.

17. The processor-readable medium of claim 15 wherein said code further comprises code to define said at least two regions of interest with respect to said parking area of interest.

18. The processor-readable medium of claim 15 wherein said code further comprises code to train said vision-based image content classification with respect to said first region of interest for use in performing said image content classification operation.

19. The processor-readable medium of claim 18 wherein said vision-based image content classification includes classification with respect to a presence of at least one vehicle class and without a presence of any vehicle class.

20. The processor-readable medium of claim 19 wherein said code further comprises code to train a classifier for performing said image content classification by:

analyzing at least two frames of training videos at said first region of interest for motion detection;

automatically collect training samples, an image of said first region of interest in one of said at least two frames, if said motion detection exceeds a threshold; and grouping collected samples by human operation into two classes comprising said presence of said at least vehicle class and said without said presence of any vehicle class.

\* \* \* \* \*